United States Patent Office 3,444,179
Patented May 13, 1969

3,444,179
PHENYL 1,3,4-OXDIAZOLE DERIVATIVES
Adolf Emil Siegrist, Basel, Peter Liechti, Binningen, Erwin Maeder, Aesch, Basel-Land, and Leonardo Guglielmetti, Birsfelden, Switzerland, assignors to Ciba Limited, Basel, Switzerland, a company of Switzerland
No Drawing. Filed Apr. 26, 1966, Ser. No. 545,269
Claims priority, application Switzerland, May 10, 1965, 6,469/65
Int. Cl. C07d 99/02, 99/10, 85/54
U.S. Cl. 260—307      4 Claims

ABSTRACT OF THE DISCLOSURE

New phenyl-1,3,4-oxdiazole derivatives are provided which are represented by the formula

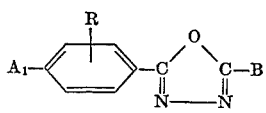

wherein $A_1$ is a 1,3,4-oxdiazolyl, phenyl, 2-benzoxazolyl or 2-naphthoxazolyl residue and B represents a residue selected from the group consisting of

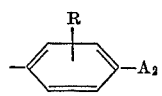

and

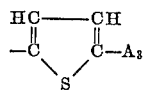

wherein $A_2$ is a 2-naphthoxazolyl or a 2-benzoxazolyl residue and $A_3$ is a 2-benzoxazolyl or a 1,3,4-oxdiazolyl residue, and R is a monovalent, non-chromophoric substituent such as halogen, alkyl, phenyl, carboxyl, sulpho, hydroxyl, amino, and their substitutive and functional derivatives. The terminal phenyl nuclei in the residue $A_1$, $A_2$ and $A_3$ may contain 1 to 2 substituents R and the phenylene nuclei of these formulae may contain one such substituent R.

The derivatives of this invention are especially useful as optical brighteners for high molecular weight organic materials.

---

The present invention provides new, valuable phenyl-1,3,4-oxdiazole derivatives of the general formula (1)

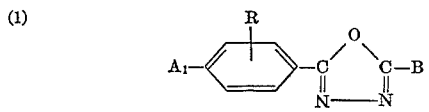

where $A_1$ represents a 1,3,4-oxdiazolyl, phenyl, 2-benzoxazolyl or 2-naphthoxazolyl residue and B a residue of the formula (1a)

or (1b)

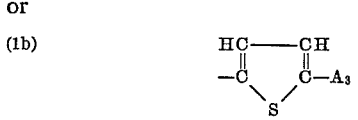

in which $A_2$ stands for a 2-naphthoxazolyl or 2-benzoxazolyl residue and $A_3$ for a phenyl, 2-benzoxazolyl or 1,3,4-oxdiazolyl residue and R represents a monovalent non-chromophoric substituent from the series halogen, alkyl, phenyl, carboxyl, sulpho, hydroxyl or amino groups and their substitutive or functional derivatives. The terminal phenyl nuclei in the residue $A_1$, $A_2$ or $A_3$ of the above Formula 1, 1a or 1b may contain 1 or 2 substituents R and/or phenylene nuclei of these formulae may contain one such substituent R. Likewise suitable are other non-chromophoric substituents, but in general they are of less practical value. The term "substitutive and functional derivatives" are used above describes, for example, halogen-, hydroxy-, cyano-, carboxy- or phenylalkyl groups; alkyl-, halogen-, alkoxy- or carboxy-hydrazide groups; analogous sulphonic acid derivatives; alkoxy, aralkoxy, phenoxy or hydroxyalkoxy groups; amino groups which may be alkylated, arylated, acylated etc.

Of special value are those compounds of the above definition which correspond to the formula (2)

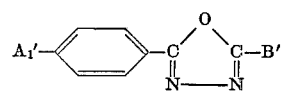

where $A_1'$ represents a 5-phenyl-1,3,4-oxdiazolyl, a 2-benzoxazolyl or 2-naphthoxazolyl residue and B' a residue of the formula (2a)

or (2b)

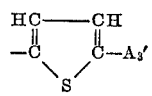

in which $A_2'$ represents a 2-benzoxazolyl residue and $A_3'$ a phenyl, 2-benzoxazolyl or 5-phenyl-1,3,4-oxdiazolyl residue; terminal phenyl nuclei of these compounds contain one or two substituents R as defined above, or preferably one substituent $R_1$ and possibly a second substituent $R_2$ as defined below in connection with Formulae 2 to 10.

Special variants of types of compounds of the general Formula 1 may be represented by the Formulae 3 and 4:

(3)

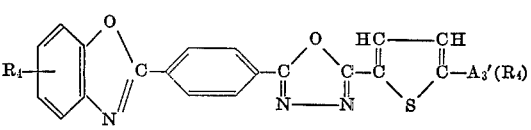

$A_3'$ represents a phenyl, 2-benzoxazolyl or 5-phenyl-1,3,4-oxdiazolyl residue, and the terminal phenyl nuclei may further contain a substituent $R_4$, being hydrogen, an alkyl group containing 1 to 4 carbon atoms or an alkoxy group containing 1 to 4 carbon atoms.

(4)

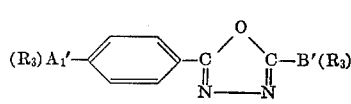

where $A_1'$ represents a 5-phenyl-1,3,4-oxdiazolyl, 2-benzoxazolyl or 2-naphthoxazolyl residue and B' a residue of the formula

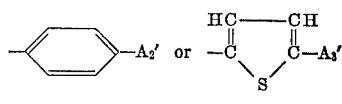

where $A_2'$ represents a 2-benzoxazolyl residue and $A_3'$ a phenyl, 2 - benzoxazolyl or 5 - phenyl-1,3,4-oxdiazolyl residue, and the terminal phenyl nuclei in this formula may contain a substituent $R_3$ being hydrogen, alkyl with 1 to 6 carbon atoms or alkoxy with 1 to 4 carbon atoms or phenyl.

From among these new phenyl-1,3,4-oxdiazole derivatives of the Formula 1 there may be specially mentioned, for example, those of the following Formulae 5 to 10:

(5)
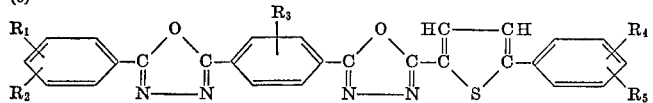

(6)
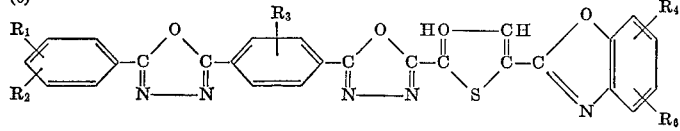

(7)
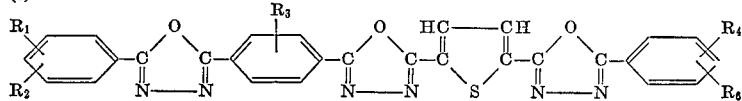

(8)
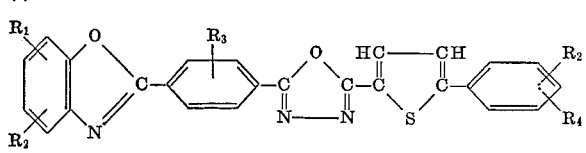

(9)
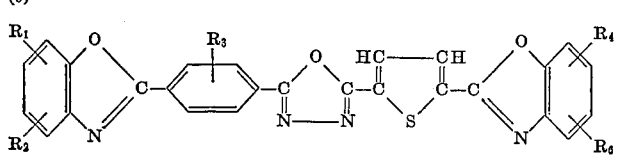

(10)
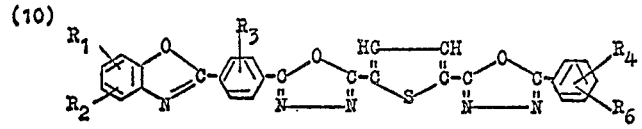

(11)
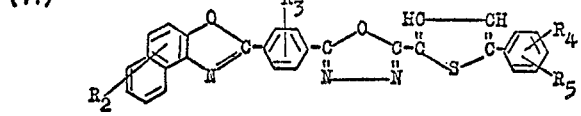

(12)
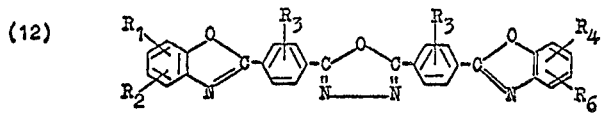

(13)
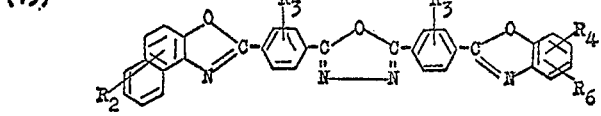

In these formulae $R_1$ and $R_6$ are identical or different residues and each may represent a hydrogen atom, a halogen atom, a linear or branched alkyl group, a phenyl group, a halogenalkyl, hydroxyalkyl or cyanoalkyl group, a nitrile or hydroxyl group, an alkoxy, aralkoxy or phenoxy group, a carboxyl group, a carboxylic acid ester, amide or hydrazide group, a sulphonic acid group or sulphonic acid ester or amide group, an alkylsulphone or arylsulphone group, an amino group which may be substituted by acyl or 1,3,5-triazinyl residues, and $R_2$, $R_3$ and $R_4$ are identical or different and each represents a hydrogen atom, a chlorine atom, an alkyl group, a free or neutralized sulphonic acid group (—$SO_2O$ cation) or a sulphonamide group, and $R_5$ represents a hydrogen atom, an alkyl or alkoxy group containing up to 4 carbon atoms, a nitrile or phenyl group.

Of special value among the products of this invention are phenyl-1,3,4-oxdiazole derivatives of the Formula 14

(14)
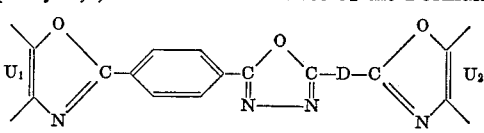

where $U_1$ represents a naphthalene or benzene residue which is linked with the azole ring in the manner indicated by the valency lines; D represents a 1,4-phenylene or 2,5-thienyl bridge member and $U_2$ a benzene residue linked with the azole ring in the manner indicated by the valency lines.

The new phenyl-1,3,4-oxdiazole derivatives may be prepared by various known methods.

According to a generally applicable manufacturing method, for example, either a carboxylic acid halide (especially chloride) of the Formula 15 is reacted with a carboxylic acid hydrazide of the Formula 16, or a carboxylic acid hydrazide of the Formula 17 with a carboxylic acid halide (preferably chloride) of the Formula 18 to form the acyl hydrazine of the Formula 19 which is then subjected to the 1,3,4-oxdiazole cyclization. This sequence of reactions may be represented as follows, where $A_1$ and $B$ in the Formulae 15 to 19 have the meanings indicated above:

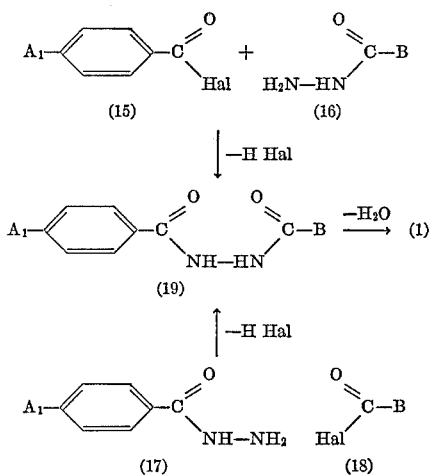

This sequence of reactions gives rise to symmetrically or asymmetrically constituted compounds of the Formula 1.

The reaction of the acid halides of the Formulae 15 and 18 with the carboxylic acid hydrazides of the Formulae 16 and 17 to furnish the acyl hydrazine of the Formula 19 may be carried out in the presence of a tertiary nitrogen base, advantageously within the temperature range from 50 to 150° C. It is advantageous to choose a tertiary nitrogen base boiling at not too low a temperature, preferably one whose boiling point is at least 100° C., for example N,N-diethyl-aniline or N,N-dimethylaniline. Particularly suitable are cyclic tertiary nitrogen bases such as quinoline and above all pyridine bases such as pyridine itself or alkylpyridines having low-molecular alkyl residues, such as 2-, 3- or 4- methyl-pyridine (picolines), ethylpyridines or mixtures of such pyridine bases.

Particularly good results have been obtained by performing the reaction leading to the acyl hydrazine of the Formula 19 in a high-boiling, inert, little polar organic solvent, for example in ortho-dichlorobenzene or chlorobenzene, in the presence of the stoichiometrically needed proportion of pyridine bases without intermediate isolation of the acyl hydrazine, because the subsequent cyclization leading to the 1,3,4-oxdiazole proceeds in a rapid and smooth manner on dropping in slightly more than the stoichiometrically required amount of thionylchloride at a temperature from 120 to 220° C., advantageously at the boiling temperature of the reaction mixture.

The phenyl-1,3,4-oxdiazole derivatives of the Formula 1 obtained by the process described above may, if desired, be used for further reactions. Thus, water-soluble derivatives are obtained when:

(a) The phenyl-1,3,4-oxdiazole derivative of the Formula 1 is sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts;

(b) One or several primary or secondary amino groups of the phenyl-1,3,4-oxdiazole derivative of the Formula 1 are converted with sultones, e.g. with propanesultone or butanesultone at an elevated temperature into the corresponding alkylsulphonic acid derivative;

(c) One or several primary amino groups of the phenyl-1,3,4-oxdiazole derivative of the Formula 1 are converted with aldehyde-bisulphite compounds e.g., with formaldehyde-alkali metal bisulphite, into the corresponding ω-methanesulphonic acid derivative;

(d) One or several primary amino groups of the phenyl-1,3,4-oxdiazole derivative of the Formula 1 are reacted with alkylsulphonic or aralkylsulphonic acids, e.g. bromoethanesulphonic acid or benzylchloride-sulphonic acid;

(e) One or several primary or secondary amino groups or hydroxyl groups of the phenyl-1,3,4-oxdiazole derivative of the Formula 1 are linked through s-triazin-2-yl bridges with phenolsulphonic acids or anilinesulphonic acids;

(f) In one or several hydroxyl groups of the phenyl-1,3,4-oxdiazole derivative of the Formula 1 a polyalkylene ether chain is introduced by means of an alkylene oxide such as ethylene oxide or propylene oxide or with a polyalkylene ether monohalide, the polyalkylene chain being of sufficient length to ensure solubility in water;

(g) One or several groups capable of quaternation present in the phenyl-1,3,4-oxdiazole derivative of the Formula 1 are reacted with quaternating agents e.g. methyliodide, dimethylsulphate, benzylchloride or toluenesulphonic acid alkyl esters at an elevated temperature, if necessary under superatmospheric pressure;

(h) One or several halogenoalkyl groups of the phenyl-1,3,4-oxdiazole derivative of the Formula 1 are converted into the corresponding quaternary derivative with tertiary bases e.g., pyridine.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope:

(I) Synthetic organic materials of high or higher molecular weight:

(a) Polymers based on organic compounds containing at least one polymerizable carbon-to-carbon double bond, i.e. their homopolymers and copolymers and products obtained by after-treating them, such as cross-linked, grafted or decomposition products, polymer dilutions or the like; relevant examples are:

Polymers based on α,β-unsaturated carboxylic acids, especially of acryl compounds (e.g., acrylic esters, acrylic acids, acrylonitrile, acrylamides and their derivatives or their methacrylic analogues), of olefinic hydrocarbons (e.g., ethylene, propylene, isobutylene, styrenes, dienes, especially butadiene, isoprene i.e., also rubbers and rubber-like polymers; furthermore so-called ABS polymers), polymers based on vinyl and vinylidene compounds (e.g., vinyl esters, vinylchloride, vinylsulphonic acid, vinyl esters, vinyl alcohol, vinylidenechloride, vinylcarbazole), of halogenated hydrocarbons (chloroprene, highly halogenated ethylenes), of unsaturated aldehydes and ketones (e.g., acrolein or the like), of allyl compounds or the like; graft polymerization products (e.g. by grafting vinylic monomers), cross-linked products (e.g. by means of bifunctional or polyfunctional cross-linking agents such as divinylbenzene, polyfunctional allyl compounds or bis-acryl compounds, or products accessible by partial decomposition (hydrolysis, depolymerization) or modification of reactive groupings (e.g. esterification, etherification, halogenation, auto-crosslinking).

(b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts;

(c) Polycondensation products or precondensates based on bifunctional or polyfunctional compounds containing condensable groups, their homo- and co-condensates and products obtained by after-treating them; relevant examples are:

Polyesters, saturated (e.g. polyethylene terephthalate) or unsaturated (e.g. maleic acid-dialcohol polycondensates and their cross-linked products with polymerizable vinyl monomers), linear or branched (also those based on polyhydric alcohols e.g. alkyd resins).

Polyamides (e.g. hexamethylenediamine adipate) maleinate resins, furan resins, carbamide resins and their precondensates, and similarly constituted products, polycarbonates, silicon resins and others.

(d) Polyadducts such as polyurethanes (if desired cross-linked), epoxy resins.

(II) Semisynthetic organic materials e.g. cellulose esters or mixed esters (acetate, propionate, nitrocellulose, cellulose ethers, regenerated cellulose (viscose, cuprammonium cellulose)) or products obtained by after-treating them, casein plastics.

(III) Natural organic materials of animal or vegetable origin, e.g. based on cellulose or proteins such as wool, cotton, silk, bast, jute, hemp, furs and hairs, leathers, finely dispersed wood masses, natural resins (such as colophony, especially lacquer resins); furthermore rubber, gutta percha, balata and products obtained by after-treating or modifying them (e.g. by curing or cross-linking), decomposition products (e.g. by hydrolysis, depolymerization), grafting, products accessible by conversion of reactive groups (e.g. by acylation, halogenation, cross-linking or the like).

The organic materials that can be optically brightened may be at any stage of their processing (raw materials, semi-finished products or finished articles) and physical states. They may be in the form of structures of any desired shape, that is to say, for example, they may be predominantly three-dimensional bodies such as blocks, plates, sections, pipes, injection mouldings or components of any desired kind, chips or granulates, foamed articles; predominantly two-dimensional bodies such as films, foils, lacquers, tapes, coatings, impregnations or coatings; or predominantly unidimensional bodies such as filaments, fibres, flocks, bristles or wires. The said materials may also be as yet not shaped and be in the most varied homogeneous and inhomogeneous forms of dispersion and physical states, for example in the form of powders, solutions, emulsions, dispersions, latices (e.g. lacquer soltuions, polymer dispersions), sols, gels, putties, pastes, waxes, adhesives, pore fillers or the like.

Fibrous materials may, for example, take the form of continuous filaments, staple fibres, flocks, hanks, textile threads, yarns, doubled yarns, fibre fleeces, felts, cotton-wool, napped products or of textile fabrics or textile laminates, knitwear, of papers, cardboards, paper pulps or the like.

The compounds to be used according to this invention are of special value for the treatment of textile organic materials, especially woven textile fabrics. If fibres—which may be staple fibres or continuous filaments, in the form of hanks, woven or knitted fabrics, fleeces, napped substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalene-sulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films, foils, tapes or mouldings they may be added to the moulding or injection moulding composition or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say before or during the chemical reaction, e.g. a polycondensation (including the precondensates), a polymerization (including the prepolymers) or a polyaddition.

The new optical brighteners can, of course, also be used whenever organic materials of the kind indicated above are combined with inorganic materials in any desired form (typical examples: detergents, white pigments in organic substances). Of special importance in this connection is the application of the new optical brighteners to fibre substrates from synthetic polyamides by the exhaustion method.

The new optical brighteners are distinguished by their particularly good heat resistance and fastness to light and to migration.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may also be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives to a wide variety of industrial products to improve their presentation or to obviate disadvantages in their use, for example as additives to glues, adhesives, paints or the like.

The compounds of the above formulae can also be used as scintillators for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

The treatment of the polyester fibres with the brighteners of this invention may also consist, for example in impregnating these fibres with an aqueous dispersion of the brightener at a temperature below 75° C., e.g. at room temperature, and then subjecting them to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry heat treatment may follow immediately upon each other or they may be performed in a single stage.

EXAMPLE 1

A mixture of 8.91 g. of 4-[2'-(4''-biphenylyl-(1'')-1',3',4'-oxdiazolyl-(5')]-benzoic acid hydrazide of the formula (20)

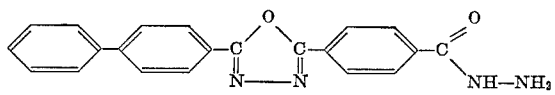

5.6 g. of 5-phenyl-thiophene-2-carboxylic acid chloride and 8 g. of pyridine in 200 ml. of dry ortho-dichlorobenzene is heated within 30 minutes to 100 to 110° C. while being stirred, further stirred at this temperature for 1 hour and then heated within 15 to 30 minutes to 165 to 170° C. 12 grams of thionylchloride are then dropped into the colourless suspension within 15 minutes at 165 to 170° C. The batch is stirred on for 5 minutes at this temperature, and the almost completely dissolved reaction product is cooled to about 15° C. and the precipitated crystals are suctioned off, washed with methanol and dried, to yield about 11.3 g. (=86.5% of theory) of the 1,3,4-oxdiazole derivative of the formula (21)

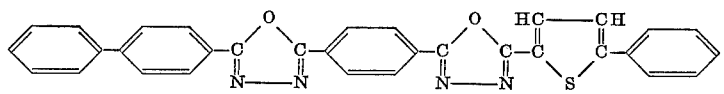

in the form of almost colourless, small needles melting at 320 to 321° C. Three recrystallizations from ortho-dichlorobenzene with the aid of bleaching earth furnish colourless, very fine needles melting at 323 to 324° C.

Analysis.—$C_{32}H_{20}O_2N_4S$, calculated: C, 73.27; H, 3.84; N, 10.68%. Found: C, 73.31; H, 3.84; N, 10.61%. Molecular weight: 524.60.

The 4-[2' - (4'' - biphenylyl-(1'')-1',3',4'-oxdiazolyl-(5')]-benzoic acid hydrazide of the Formula 20 used as starting material may be prepared as follows:

A mixture of 106.1 g. of diphenyl-4-carboxylic acid hydrazide, 93.5 g. of terephthalic acid monomethyl ester chloride and 80 g. of pyridine in 800 ml. of dry ortho-dichlorobenzene is heated within 40 minutes to 100 to 110° C., further stirred for 1 hour at this temperature and then within 30 minutes heated to 160 to 165° C. 70 grams of thionylchloride are dropped into the colourless suspension within 40 minutes at 160 to 165° C., whereupon gradually a solution is obtained which is stirred on at this temperature for 5 to 10 minutes, then cooled to about 15° C., and the precipitated crystalline reaction product is suctioned off, washed with methanol and dried. Yield: about 157.2 g. (=88.3% of theory) of 2-[4'-biphenylyl - (1')] - 5 - [4'' - carbomethoxy-phenyl-(1'')]-1,3,4-oxdiazole of the formula (22)

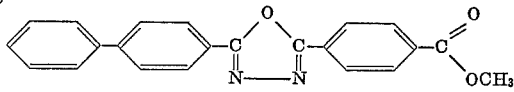

in the form of an almost colourless, finely crystalline powder which melts at 217 to 218° C. After three recrystallizations from ortho-dichlorobenzene with the aid of bleaching earth there are obtained colourless, very fine crystals melting at 220 to 220.5° C.

Analysis.—$C_{22}H_{16}O_3N_2$, calculated: C, 74.14; H, 4.53; N, 7.86%. Found: C, 74.14; H, 4.53; N, 8.18%. Molecular weight: 356.36.

The hydrazide of the Formula 20 is obtained by stirring 106.9 g. of methyl ester of the Formula 22 in 15 ml. of methylglycol with 75 g. of hydrazine hydrate for 15 hours under a slight reflux, then cooled to room temperature, suction-filtered, washed with methanol and dried, to yield about 93.7 g. (=87.7% of theory) of 4-[2'-(4''-biphenylyl-(1''))-1',3',4'-oxdiazolyl - (5')]-benzoic acid hydrazide of the Formula 20 in the form of a colourless powder melting at 337 to 338° C.

EXAMPLE 2

A mixture of 8.91 g. of 4-[2'-(4''-biphenylyl-(1''))-1',3',4'-oxdiazolyl-(5')]-benzoic acid hydrazide of the Formula 20, 6.6 g. of 5-[benzoxazolyl-(2')]-thiophene-2-carboxylic acid chloride of the formula (23)

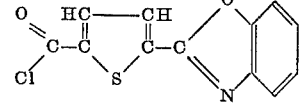

and 8 g. of pyridine in 200 ml. of dry ortho-dichlorobenzene is stirred within 15 minutes to 100 to 110° C. while being stirred, then stirred on at this temperature for 1 hour and then heated within 15 to 30 minutes to 165 to 170° C. While vigorously stirring the light grey suspension at 165 to 170° C., 12 g. of thionylchloride are dropped in within 15 minutes, during which the reaction product gradually turns yellow. The batch is stirred on for 5 minutes at this temperature, then cooled to about 15° C., and the precipitated 1,3,4-oxdiazole derivative of the formula (24)

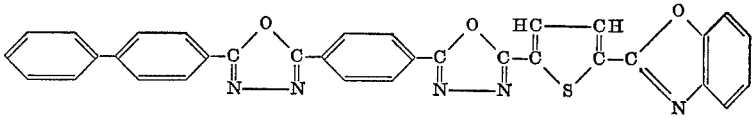

is suctioned off, washed with methanol and dried, to yield about 12.9 g. (=91.3% of theory) of a pale-yellowish powder melting at 364 to 366° C. After three recrystallizations from ortho-dichlorobenzene with the aid of bleaching earth, there are obtained pale-yellow, fine crystals melting at 374 to 375° C.

Analysis.—$C_{33}H_{19}O_3N_5S$, calculated: C, 70.08; H, 3.39; N, 12.38%. Found: C, 70.16; H, 3.43; N, 12.37%. Molecular weight: 565.61.

By using instead of 6.6 g. of 5-[benzoxazolyl-(2')]-thiophene-2-carboxylic acid chloride of the Formula 23 8.0 g. of 5-[5'-tertiary butylbenzoxazolyl-(2')]-thiophene-2-carboxylic acid chloride of the formula

(25) 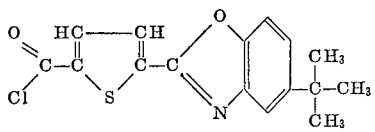

there are obtained about 13.7 g. (=88.5% of theory) of the 1,3,4-oxdiazole derivative of the formula

(26) 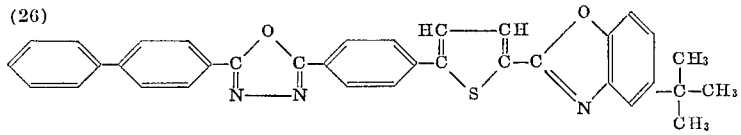

in the form of a pale-yellow powder melting at 350 to 351° C. After three recrystallizations from ortho-dichlorobenzene with the aid of bleaching earth it forms pale-yellow, very fine crystals melting at 354 to 354.5° C.

Analysis.—$C_{37}H_{27}O_3N_5S$, calculated: C, 71.48; H, 4.38; N, 11.26%. Found: C, 71.47; H, 4.36; N, 11.32%. Molecular weight: 621.72.

The 5-[benzoxazolyl-(2')]-thiophene-2-carboxylic acid chloride of the Formula 23 used as starting material may be prepared as follows:

A mixture of 579 g. of 5-[benzoxazolyl-(2')]-thiophene-2-carboxylic acid, 3.5 litres of chlorobenzene, 250 ml. of thionlychloride and 10 ml. of dimethylformamide is refluxed for 2 hours. Then another 250 ml. of thionylchloride are added and the batch is refluxed for another 2 hours. The excess thionylchloride together with about half the solvent is then distilled off, the distillation residue filtered while still hot and allowed to cool. The 5-[benzoxazolyl-(2')]-thiophene-2-carboxylic acid chloride of the Formula 23 crystallizes out. After suctioning, washing with n-hexane and drying, there are obtained 530 g. (=83.8% of theory) of pale-yellow crystals melting at 163 to 164° C. which, after recrystallization from chlorobenzene, reveal the following analytical data:

Analysis.—$C_{12}H_6O_2N_6SCl$, calculated: C, 54.66; H, 2.29; Cl, 13.44%. Found: C, 54.36; H, 2.11; Cl, 13.34%. Molecular weight: 263.70.

In a similar manner the 5-[5'-tertiary butylbenzoxazolyl-(2')]-thiophene-2-carboxylic acid chloride of the Formula 25 used as starting material may be prepared. It forms pale-yellow, shiny crystals from ligroin. Melting point: 176 to 178° C.

Analysis.—$C_{16}H_{14}O_2N_6SCl$, calculated: C, 60.09; H, 4.41; N, 4.38; Cl, 11.09%. Found: C, 60.17; H, 4.33; N, 4.25; Cl, 11.24%. Molecular weight: 319.81.

EXAMPLE 3

5.46 grams of 5-phenyl-thiophene-2-carboxylic acid hydrazide [prepared by refluxing 1 mol of 5-phenoyl-thiophene-2-carboxylic acid ethyl ester for 24 hours with 4 mols of hydrazine hydrate in ethanol; melting at 165.5 to 165.50 C.], 6.44 g. of 4-[benzoxazolyl-(2')]-benzoylchloride of the formula

(27) 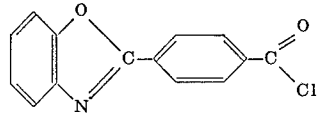

[obtained by refluxing 4-[benzoxazolyl-(2')]-benzoic-acid for several hours in benzene with excess thionylchloride and a catalytic amount of dimethylformamide; melting at 211 to 213° C.] and 8 g. of pyridine in 200 ml. of dry ortho-dichlorobenzene are heated within 15 minutes to 100 to 110° C. while being stirred, then stirred on at this temperature for 1 hour, and within 15 to 30 minutes heated to 165 to 170° C. In the course of 15 minutes at 165 to 170° C. 12 g. of thionylchloride are vigorously stirred dropwise into the light-brown solution of the reaction product. The batch is stirred for another 5 minutes at this temperature, then cooled to about 15° C., 100 ml. of methanol are added, and the precipitated 1,3,4-oxdiazole derivative of the formula

(28) 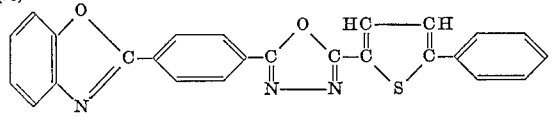

is suctioned off, washed with methanol and dried, to yield about 9.0 g. (=85.5% of theory) of a faintly beige coloured powder which melts at 284.5 to 285.5° C. After three recrystallizations from ortho-dichlorobenzene with the aid of bleaching earth the product forms colourless, very fine crystals melting at 292.5 to 293° C.

Analysis.—$C_{25}H_{15}O_2N_3S$, calculated: C, 71.24; H, 3.59; N, 9.97%. Found: C, 71.53; H, 3.68; N, 9.91%. Molecular weight: 421.48.

The following 1,3,4-oxdiazole derivatives may be prepared in a similar manner:

From 13.4 g. of 4-[5'-methyl-benzoxazolyl-(2')]-benzoic acid hydrazide of the formula

(29) 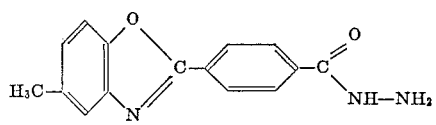

and 11.2 g. of 5-phenyl-thiophene-2-carboxylic acid chloride: the 1,3,4-oxdiazole derivative of the formula

(30) 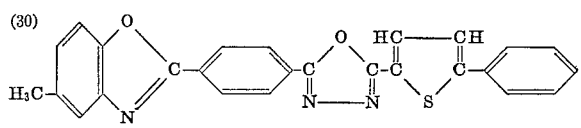

in a yield of 18.7 g. (=86.1% of theory) in the form of pale-yellow, very fine, felted needles from ortho-dichlorobenzene, melting at 285.5 to 286.5° C.

Analysis.—$C_{26}H_{17}O_2N_3S$, calculated: C, 71.71; H, 3.93; N, 9.65%. Found: C, 71.85; H, 3.98; N, 9.59%. Molecular weight: 435.51.

From 15.16 g. of 4-[naphth(2:1)-oxazolyl-(2′)]-benzoic acid hydrazide of the formula

(31) 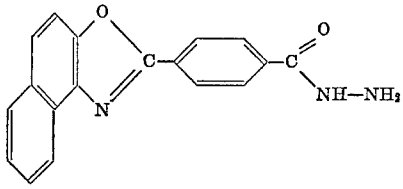

and 11.2 g. of 5-phenyl-thiophene-2-carboxylic acid chloride: The 1,3,4-oxdiazole derivative of the formula

(32) 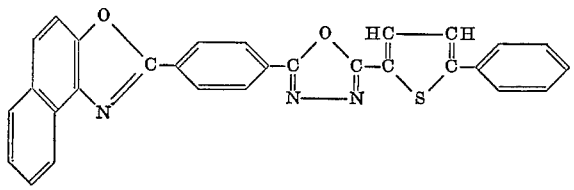

in a yield of 15.4 g. (=65.6% of theory) in light-yellow, very fine crystals from ortho-dichlorobenzene, melting at 282 to 285° C.

Analysis.—$C_{29}H_{17}O_2N_3S$, calculated: C, 73.87; H, 3.63; N, 8.91%. Found: C, 73.55; H, 3.69; N, 8.96%. Molecular weight: 471.54.

The 4-[naphth(2:1-oxazolyl-2′)]-benzoic acid hydrazide of the Formula 31 used as starting material may be prepared in the following manner:

A mixture of 63.6 g. of 1-amino-2-hydroxynaphthalene, 79.5 g. of benzene-1-carboxylic acid methyl ester-4-carboxylic acid chloride in 400 ml. of anhydrous ortho-dichlorobenzene is heated with exclusion of air within 3½ hours gradually to 160° C.; 2 g. of boric acid are added and the temperature is raised to about 200 to 210° C., during which the orthodichlorobenzene is almost completely distilled off. During the subsequent cooling the brown reaction solution is diluted first with 200 ml. of dioxan and then with 200 ml. of methanol, cooled to 1° C., suctioned, washed with cold methanol and dried, to yield about 115.8 g. (=95.4% of theory) of 4-[naphth(2:1)-oxazolyl-(2′)]-benzoic acid methyl ester in the form of a light-yellowish powder melting at 198 to 199° C. For purification the ester is recrystallized from tetrachlorethylene with the aid of bleaching earth and then sublimed under a high vacuum, to yield an almost colourless, finely crystalline powder melting at 203° C.

Analysis.—$C_{19}H_{13}O_3N$, calculated: C, 75.24; H, 4.32; N, 4.62%. Found: C, 75.47; H, 4.26; N, 4.63%. Molecular weight: 303.30.

A mixture of 151.5 g. of the methyl ester, 750 ml. of diethyleneglycol diethyl ether and 50 g. of hydrazine hydrate is stirred for 24 hours at 110 to 115° C., then cooled, diluted with 1 litre of methanol, suctioned, washed with methanol and dried, to yield about 151.2 g. (=99.8% of theory) of 4-[naphth(2:1)-oxazolyl-(2′)]-benzoic acid hydrazide of the Formula 31 in the form of a pale-yellow, finely crystalline powder melting above 400° C.

In a similar manner the 4-[5′-methylbenzoxazolyl-(2′)]-benzoic acid hydrazide of the Formula 29 used as starting material may be prepared. It forms almost colourless, fine needles melting at 259.5 to 260.5° C.

EXAMPLE 4

A mixture of 6.34 g. of 4-[benzoxazolyl-(2′)]-benzoic acid hydrazide of the formula

(33) 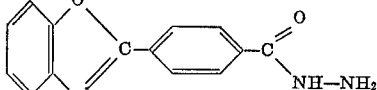

[prepared by reacting the methyl ester with hydrazine hydrate in methylglycol; almost colourless, shiny flakes from dimethylformamide, melting at 272 to 272.5° C.], 6.6 g. of 5-[benzoxazolyl-(2′)]-thiophene-2-carboxylic acid chloride of the Formula 23 and 8 g. of pyridine in 200 ml. of anhydrous ortho-dichlorobenzene is heated within 15 minutes to 100 to 110° C. while being stirred. The whole is stirred for another hour at this temperature and then within 15 to 30 minutes heated to 160 to 165° C. In the course of 15 minutes at 160 to 165° C. 12 g. of thionylchloride are dropped into the vigorously stirred, light beige coloured suspension. The batch is stirred for another 5 minutes at this temperature, cooled to about 15° C., and the reaction product is suctioned off, washed with methanol and dried, to yield 10 g. (=89.9% of theory) of the 1,3,4-oxdiazole derivative of the formula

(34) 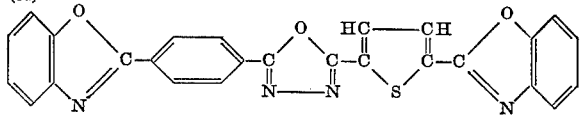

in the form of a light brown powder melting at 363 to 364° C. Three recrystallizations from ortho-dichlorobenzene with the aid of bleaching earth furnish light, greenish yellow, felted needles melting at 364 to 365° C.

Analysis.—$C_{26}H_{14}O_3N_4S$, calculated: C, 67.52; H, 3.05; N, 12.11%. Found: C, 67.30; H, 3.02; N, 12.00%. Molecular weight: 462.49.

In a similar manner the following 1,3,4-oxdiazole derivatives are accessible:

(35) 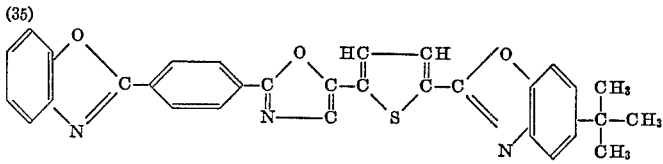

Yield: 10.6 g. (=82.0% of theory). Light-yellow, very fine crystals from ortho-dichlorobenzene, melting at 354 to 355° C.

Analysis.—$C_{30}H_{22}O_3N_4S$, calculated: C, 69.48; H, 4.28; N, 10.80%. Found: C, 69.26; H, 4.22; N, 10.87%. Molecular weight: 518.60.

(36) 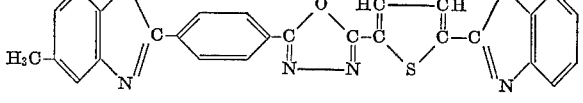

Yield: 10.1 g. (=85.1% of theory). Light-yellow, very fine needles from ortho-dichlorobenzene, melting at 347 to 348° C.

Analysis.—$C_{27}H_{16}O_3N_4S$, calculated: C, 68.06; H, 3.38; N, 11.76%. Found: C, 67.94; H, 3.40; N, 11.71%. Molecular weight: 476.51.

(37) 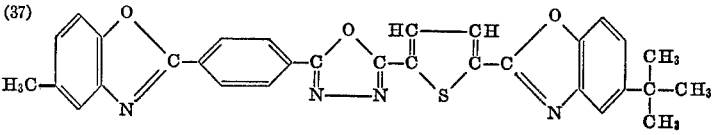

Yield: 11.8 g. (=88.7% of theory). Pale-yellow, very fine, felted needles from ortho-dichlorobenzene, melting at 358 to 359° C.

Analysis.—$C_{31}H_{24}O_3N_4S$, calculated: C, 69.91; H, 4.54; N, 10.52%. Found: C, 69.93; H, 4.45; N, 10.43%. Molecular weight: 532.62.

EXAMPLE 5

A mixture of 6.44 g. of 4-[benzoxazolyl-(2′)]-benzoylchloride of the Formula 24, 7.16 g. of 5-[5′-phenyl-(1″)-1′,3′,4′-oxdiazolyl-(2′)]-thiophene-2-carboxylic acid hydrazide of the formula

(38)
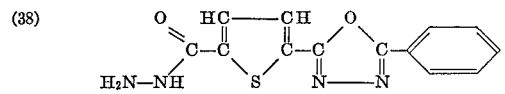

and 8 g. of pyridine in 200 ml. of anhydrous ortho-dichlorobenzene is heated within 20 minutes to 100 to 110° C. while being stirred. The batch is stirred for another hour at this temperature and then heated within 15 to 30 minutes to 165 to 170° C. 12 grams of thionylchloride are then dropped within 15 minutes at 165 to 170° C. into the vigorously stirred light beige coloured suspension. The batch is stirred for another 5 minutes at this temperature and then cooled to about 15° C. The resulting 1,3,4-oxdiazole derivative of the formula

(39)
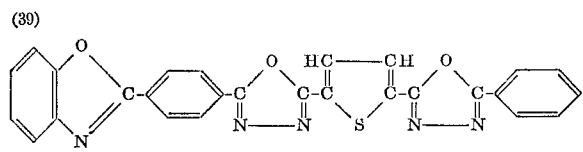

is suctioned off, washed with methanol and dried, to yield about 8.8 g. (=72.1% of theory) of a light beige coloured powder melting at 344 to 346° C. Three recrystallizations from ortho-dichlorobenzene with the aid of bleaching earth furnish faintly yellowish, very fine crystals melting at 345 to 346° C.

Analysis.—$C_{27}H_{15}O_3N_5S$, calculated: C, 66.25; H, 3.09; N, 14.31%. Found: C, 65.99; H, 3.34; N, 14.27%. Molecular weight: 489.51.

In a similar manner the following 1,3,4-oxdiazole derivatives may be prepared:

(40)
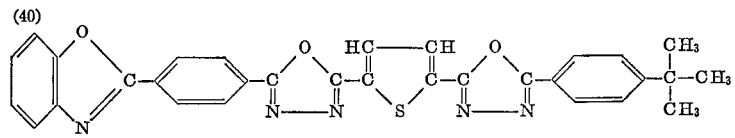

Yield: 11.5 g. (=84.8% of theory). Faintly yellowish, fine, shiny flakes and needles from ortho-dichlorobenzene, melting at 349 to 350° C.

Analysis.—$C_{31}H_{23}O_3N_5S$, calculated: C, 68.24; H, 4.25; N, 12.84%. Found: C, 68.09; H, 4.07; N, 12.89%. Molecular weight: 545.62.

(41)
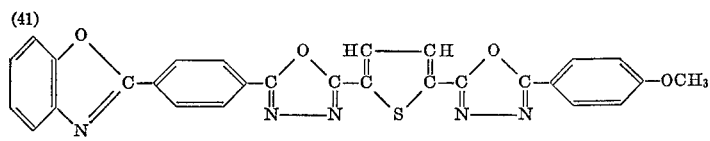

Yield: 11.1 g. (=86.2% of theory). Faintly yellowish, finely crystalline powder from trichlorobenzene, melting at 336.5 to 337° C.

Analysis.—$C_{28}H_{17}O_4N_5S$, calculated: C, 64.73; H, 3.30; N, 13.48%. Found: C, 64.79; H, 3.27; N, 13.38%. Molecular weight: 519.54.

EXAMPLE 6

A mixture of 7.58 g. of 4-[naphth(2:1)-oxazolyl-(2′)]-benzoic acid hydrazide of the Formula 31, 6.44 g. of 4-[benzoxazolyl-(2′)]-benzoylchloride of the Formula 27 and 8 g. of pyridine in 200 ml. of anhydrous ortho-dichlorobenzene is heated within 20 minutes to 100 to 110° C., then stirred for another hour at this temperature and then heated within 15 to 30 minutes to 165 to 170° C. While vigorously stirring the almost colourless suspension of the reaction product at 165 to 170° C., 12 g. of thionylchloride are dropped in within 15 minutes, during which the colour gradually changes to yellow. The batch is stirred for another 5 minutes at this temperature, then cooled to about 15° C. and 200 ml. of methanol are added, whereupon the 1,3,4-oxdiazole derivative of the formula

(42)
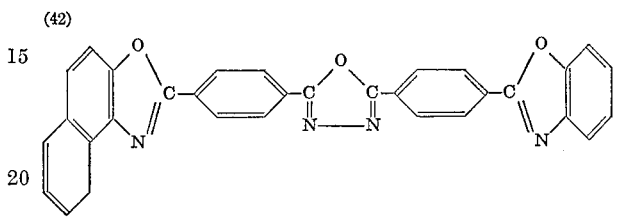

is suctioned off, washed with methanol and dried. Yield: 8.8 g. (=69.8% of theory) of a faintly yellowish powder melting above 400° C. Three recrystallizations from such trichlorobenzene with the aid of bleaching earth furnish faintly yellowish, fine crystals.

Analysis.—$C_{32}H_{18}O_3N_4$, calculated: C, 75.88; H, 3.58; N, 11.06%. Found: C, 75.64; H, 3.87; N, 11.21%. Molecular weight: 506.50.

EXAMPLE 7

A mixture of 14.46 g. of 4-[naphth(2:1)-oxazolyl-(2′)]-benzoic acid [prepared by hydrolyzing the methyl ester in dioxan with sodium hydroxide; melting at 342.5 to 343° C.], 4 g. of pyridine and 12 g. of thionylchloride in 250 ml. of anhydrous ortho-dichlorobenzene are stirred and heated for 3 hours at 105 to 110° C. The excess thionylchloride is then distilled off under vacuum, and the reaction mixture is cooled to about 30° C.; 8 g. of pyridine and 1.25 g. of hydrazine hydrate are added and in the course of 90 minutes the temperature is raised to 160° C. While vigorously stirring the batch, 15 g. of thionylchloride are dropped in within 15 minutes at 160 to 165° C. The reaction mixture is stirred on for 5 minutes at this temperature, cooled to about 15° C. and the product is suctioned off, washed with methanol and dried, to yield about 11.1 g. (=79.8% of theory) of the 1,3,4-oxdiazole derivative of the formula

(43)
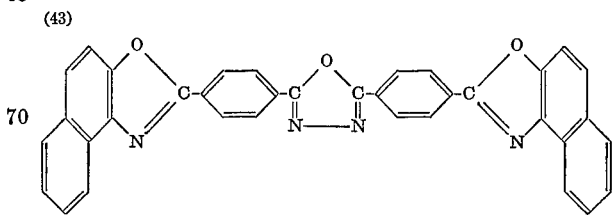

in the form of a faintly yellowish, finely crystalline powder melting above 420° C.

EXAMPLE 8

An intimate mixture of 100 g. of polyester granulate from polyterephthalic acid ethyleneglycol ester and 0.05 g. of the compound of the Formula 34 is melted at 285° C. while being stirred. The spinning mass is spun through conventional spinnerets and the filaments are stretched, whereupon considerably brightened polyester fibres are obtained.

Alternatively, the compound of the Formula 34 may be added to the starting materials before or during the polycondensation leading to the polyester.

Similar brightening effects are achieved by using the compound of the Formula 28, 30 or 42 instead of the compound of the Formula 34.

EXAMPLE 9

10,000 parts of a polyamide in chip form, prepared in the known manner from hexamethylenediamine adipate, are mixed with 30 parts of titanium dioxide (rutile modification) and 5 parts of the compound of the Formula 28, 30 or 42 in a tumbler for 12 hours. The chips treated in this manner are then melted in a boiler, which is heated with oil or diphenyl vapour at 300 to 310° C. and from which the atmospheric oxygen has been displaced with superheated steam; the melt is stirred for half an hour and then expressed under a nitrogen pressure of 5 atmospheres (gauge) through a spinneret and the resulting filament is wound on a spinning bobbin. The filaments obtained in this manner display a strong brightening effect which is very fast to light.

If a polyamide from ε-caprolactam is used instead of the polyamide prepared from hexamethylenediamine adipate, similar, good results are obtained.

What is claimed is:

1. A phenyl-1,3,4-oxdiazole derivative of the formula

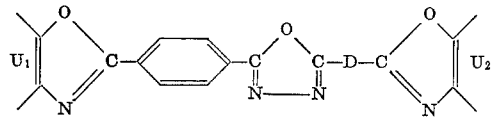

where $U_1$ represents a residue selected from the group consisting of naphthalene and benzene linked with the azole ring in the manner indicated by the valency lines; D stands for a member selected from the group consisting of a 1,4-phenylene and a 2,5-thienylene bridge member and $U_2$ for a benzene residue linked with the azole ring in the manner indicated by the valency lines.

2. A new phenyl-1,3,4-oxdiazolyl derivative of the formula

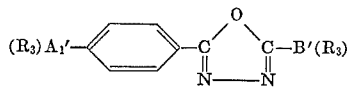

where $A_1'$ represents a member selected from the group consisting of a 5-phenyl-1,3,4-oxdiazolyl, 2-benzoxazolyl and 2-naphthoxazolyl residue and B' a residue selected from the group consisting of

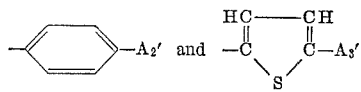

in which $A_2'$ stands for a 2-benzoxazolyl residue or 2-naphthoxazolyl and $A_3'$ for a member selected from the group consisting of a phenyl, 2-benzoxazolyl and 5-phenyl-1,3,4-oxiazolyl residue and in which terminal phenyl nuclei in this formula may contain a substituent $R_3$ which represents a member selected from the group consisting of hydrogen, an alkyl group containing 1 to 6 carbon atoms, an alkoxy group containing 1 to 4 carbon atoms, and a phenyl group.

3. A new phenyl-1,3,4-oxdiazolyl derivative of the formula

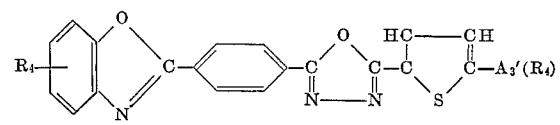

wherein $A_3'$ represents a member selected from the group consisting of a phenyl, 2-benzoxazolyl and a 5-phenyl-1,3,4-oxdiazolyl residue and the terminal phenyl nuclei may further contain a substituent $R_4$ which represents a member selected from the group consisting of hydrogen, an alkyl group containing 1 to 4 carbon atoms and an alkoxy group containing 1 to 4 carbon atoms.

4. The compound according to formula

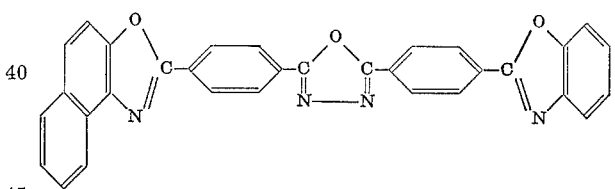

References Cited

UNITED STATES PATENTS 3,242,188   3/1966   Siegrist et al. _____ 260—307

ALEX MAZEL, *Primary Examiner.*

R. V. RUSH, *Assistant Examiner.*

U.S. Cl. X.R.

106—193; 252—300; 260—37, 41